United States Patent
Moser

[15] 3,690,354
[45] Sept. 12, 1972

[54] TREE HARVESTER CONTROL CIRCUIT

[72] Inventor: Raymond L. Moser, Tremont, Ill.
[73] Assignee: Caterpillar Tractor, Peoria, Ill.
[22] Filed: Feb. 8, 1971
[21] Appl. No.: 113,327

[52] U.S. Cl. .............................................. 144/34 R
[51] Int. Cl. ........................................... A01g 23/02
[58] Field of Search ................... 144/2 Z, 3 D, 34 R

[56] References Cited

UNITED STATES PATENTS

3,595,284  7/1971  Landers ..................... 144/2 Z

Primary Examiner—Gerald A. Dost
Attorney—Fryer, Tjensvold, Felix, Phillips & Lempio

[57] ABSTRACT

A control circuit for a tree harvester having a processing implement and a shear assembly for cutting standing trees with a drive mechanism for propelling the tree past the implement and grapples for maintaining the tree in engagement with the drive mechanism. A single control valve is operable into a first position for actuating the shear assembly and into a second position for retracting the shear assembly and operating the drive mechanism. A directional valve provides operating fluid for positioning the grapples and implement in engagement with the tree while the control valve is in either of its operating positions, the directional valve being selectively operable to retract the grapples and implement in order to release the tree from the harvester. A check valve for communicating fluid to the implement and grapples tends to maintain those components in engagement with the tree while also functioning to coordinate operating pressures for the grapples and drive mechanism and to permit floating operation of the implement in order to provide for effective and efficient operation of the tree harvester.

19 Claims, 5 Drawing Figures

TREE HARVESTER CONTROL CIRCUIT

REFERENCE TO RELATED U.S. PATENTS

Portions of a tree harvester providing a preferred environment for the present control circuit, are described in greater detail in U.S. application Ser. No. 58,466, titled "Shear Assembly For Tree Harvesters" and filed on July 27, 1970 by R. L. Moser, et al.; U.S. application Ser. No. 58,467, titled "Delimbing Assembly For Tree Harvester" and filed on July 27, 1970 by R. L. Moser, et al.; and U.S. Pat. application Ser. No. 58,465, titled "Drive Mechanism For Tree Harvesters" and filed on July 27, 1970 by Nathan Gutman, et al., all of the above being assigned to the assignee of the present invention.

A control circuit as provided by the present invention is described below with specific reference to a tree harvester which provides a preferred environment for the circuit. However, at least a portion of the control circuit of the present invention is also applicable to other machines, for example, feed mechanisms for propelling an object past a processing implement by means of a drive mechanism with grapple means employed to maintain the object in proper engagement with the drive mechanism. In such combination, the present invention provides operating pressure coordination between the grapple means and the drive mechanism so that the object is forced against the drive mechanism by the grapple means in general proportion to the operating pressure required in the drive mechanism to propel the object past the implement.

The control circuit of the present invention is particularly contemplated for use with tree harvesters which are capable of cutting a standing tree and then propelling the tree through one or more processing implements, for example, a delimber assembly to remove limbs and other projections from the tree trunk. Such harvesters commonly include a shear assembly for severing the standing tree, a processing implement such as a delimbing assembly which may be hydraulically operable for processing engagement with the tree, a drive mechanism for propelling the tree past the implement and one or more grapples for maintaining the tree in engagement with the drive mechanism.

In a typical method of operation for such a harvester, the drive mechanism and shear assembly are properly positioned against a standing tree with the grapples and implement being engaged with the tree in order to support the tree after it is severed by the shear assembly. The drive mechanism is then actuated, with the grapples and implement maintained in engagement with the tree, in order to propel the tree past or through the delimbing implement. The shear assembly may again be intermittently actuated for sectioning the delimbed tree or for removing the top of the tree for example. After processing of the tree is completed, the grapples and implement are then retracted in order to release the processed tree and prepare the harvester for receiving and processing yet another standing tree.

In a tree harvester of the type having the various components and method of operation as discussed above, it is apparent that a substantial number of operating manipulations are required during the processing of a single tree. Accordingly, it is an object of the present invention to provide such a control circuit which is relatively simple and inexpensive while substantially reducing the number of manipulations required by the operator. The present invention more particularly provides such a control circuit having a single control valve including two operating positions for regulating substantially the entire operation during which a standing tree is cut and then processed.

It is also an object of the invention to provide such a control circuit including means for maintaining the implement and grapples in engagement with the tree until it is completely processed.

It is also an object of the invention to provide such a control circuit including means for providing interdependent operating pressures for the grapple means and drive mechanism so that a force of engagement between the tree and drive mechanism, as developed by the grapple means, varies with the fluid pressure necessary to maintain operation of the drive mechanism. Thus, when substantial fluid pressure is required in the drive mechanism for propelling the tree past the implement, the grapple means tend to be tightened against the tree in order to insure its effective engagement with the drive mechanism. On the other hand, when the load on the drive mechanism is relatively light, the grapple means is slightly relaxed so that the tree may be more easily fed or propelled past the implement. This arrangement tends to reduce damage to the tree due to slippage between the drive mechanism and the tree while also serving to maintain the drive mechanism in positive engagement with the tree when necessary.

It is again noted that the present control circuit, or at least substantial portions thereof, may also be used with other types of tree harvesters than the one described below and with other machines, for example, a feed arrangement wherein a drive mechanism for propelling or feeding an object past a processing implement is maintained in engagement with the object by various grapple means. Proportional operation of the grapple means with relation to the drive mechanism may also be used to advantage in such arrangements. Accordingly, it is also an object of the present invention to provide a control circuit for such machines.

It is also noted that certain tree harvesters or processing machines similarly employ one or more processing implements, a drive mechanism and various types of grapple means for processing trees which have previously been felled. Accordingly, it is also an object of the present invention to provide a control circuit for tree harvesters or processing machines which may or may not include a shear assembly.

It is still another object of the present invention to provide a control circuit for a tree harvester or processing attachment of the type which may be mounted on a generally conventional vehicle with the control circuit being adapted for operation by hydraulic valves or components common to such vehicles. For example, a bucket loader vehicle equipped with lift arms and a tilt linkage includes lift and tilt controls which may be employed for positioning such a processing attachment. Such vehicles also commonly have an additional hydraulic valve for controlling a circuit other than tilt and lift. For example, this additional valve may be used in conjunction with an ejector bucket to control the ejector element, a side dump bucket or a demolition bucket supported by the lift arms and tilt linkage of the vehicle. Thus, the present control circuit is readily adaptable for operation by existing components of the vehicle. This feature reduces the cost of the attachment and control circuit. Also, interchange of implements or attachments on the vehicle is simplified so that the vehicle may be readily adapted for different operations such as tree harvesting and bucket loading.

Other objects and advantages of the present invention are made apparent in the following description having reference to the accompanying drawings.

In the drawings:

FIG. 5 illustrates the proper arrangement of FIGS. 3 and 4 for viewing the complete representation of the control circuit.

Figure 1:
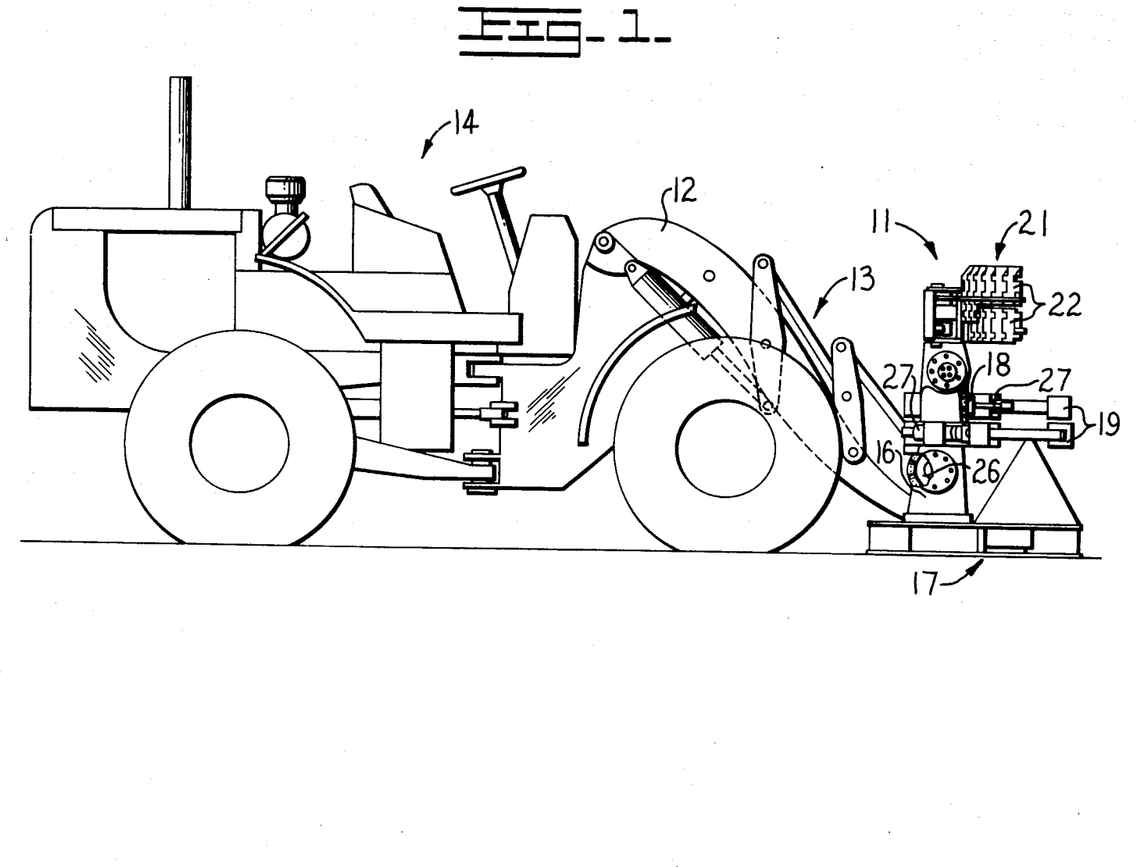
FIG. 1 is a side view in elevation of a tree harvester providing a preferred environment for the control circuit of the present invention.
Figure 2:
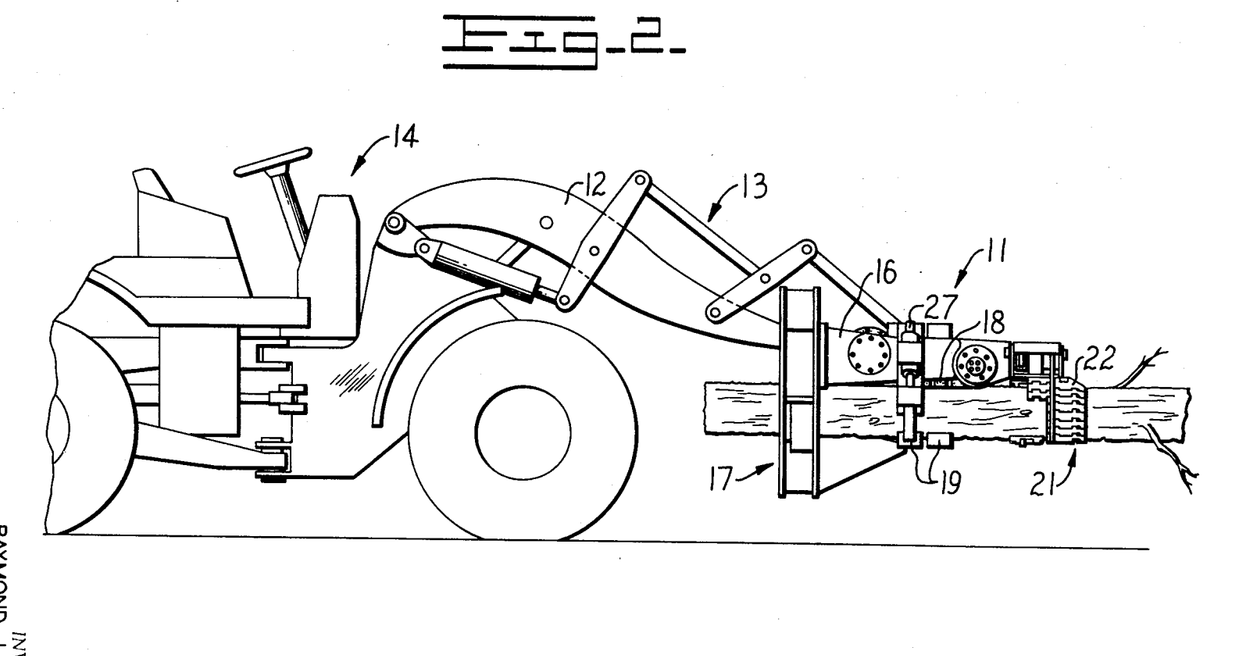
FIG. 2 is a similar view of the tree harvester machine including a tree which has been cut and rotated into a position for processing by the harvester attachment.

A tree harvester of the type with which the present control circuit is particularly contemplated for use, is illustrated in FIGS. 1 and 2. A harvester attachment 11 is pivotally secured to the lift arms, one of which is indicated at 12, and the tilt linkage 13 of an otherwise conventional loader vehicle 14.

The harvester attachment 11 includes a rigid frame 16 upon which various components of the harvester are arranged. The components include a shear assembly 17, a drive mechanism indicated at 18, grapple arms 19 and a delimbing assembly 21 including flexible blade elements 22 which may be wrapped around the circumference of a tree for removing limbs from the tree as it is propelled past the delimbing assembly by the drive mechanism.

Figure 3:
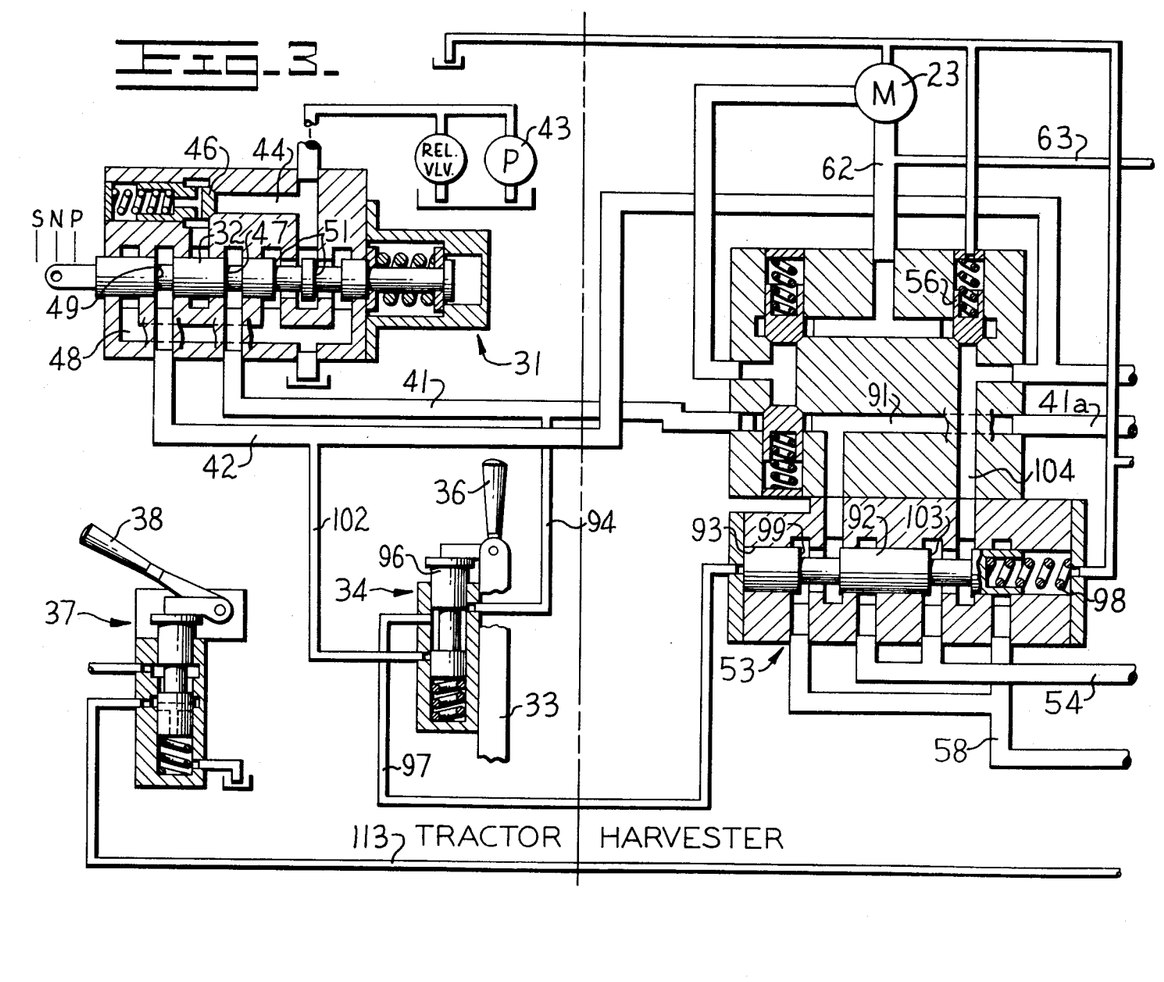
FIGS. 3 and 4 taken together, provide a generally schematic presentation, with parts being shown in section, of a control circuit embodying various features of the present invention while being particularly adapted for use with a tree harvester of the type illustrated in FIG. 1.
Figure 4:
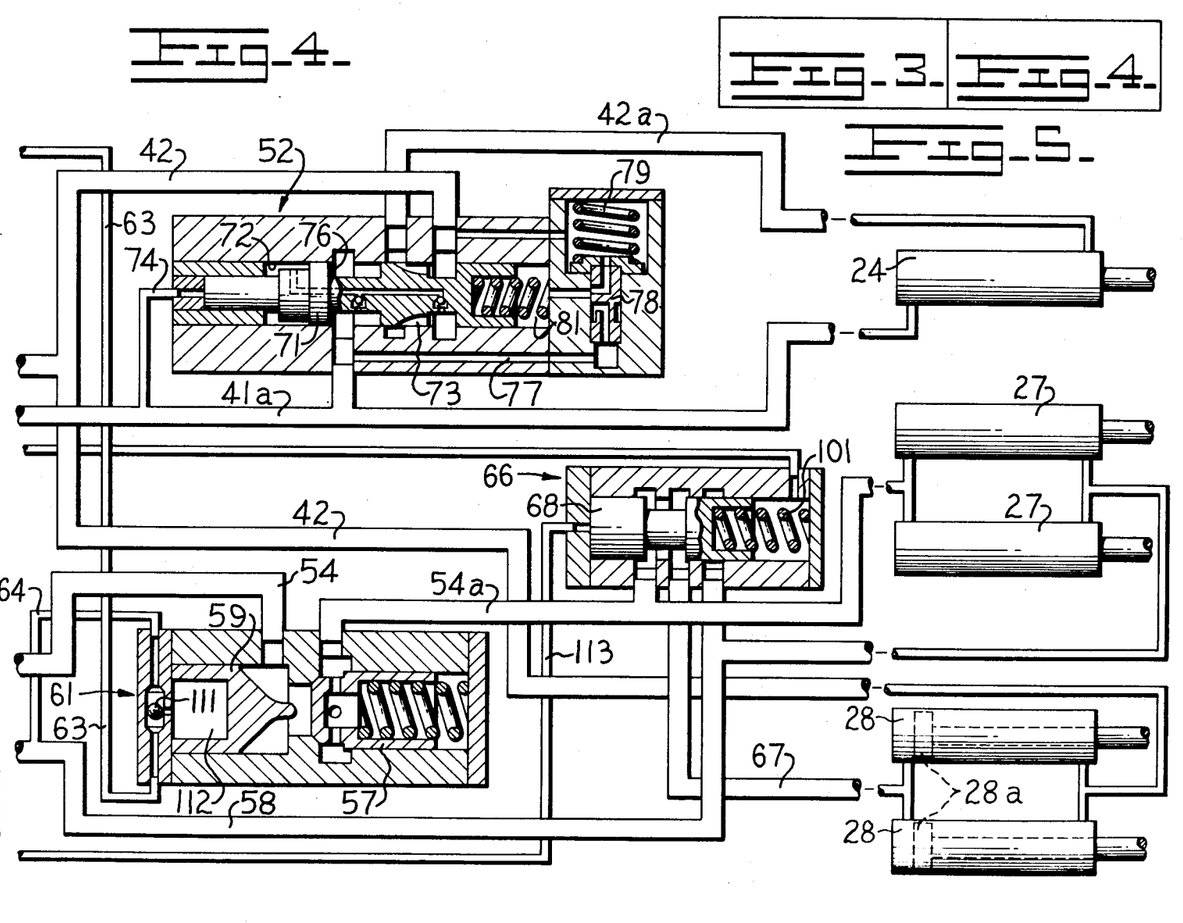

Hydraulic motors for operating the various components of the harvester are illustrated in the control circuit of FIGS. 3 and 4. Referring to those figures as well, a rotary drive motor 23 (see FIG. 3) is coupled with a pair of drive sprockets, one of which is indicated at 26 in FIG. 1, for operating the drive mechanism 18. The other hydraulic motors are illustrated in FIG. 4, including a double acting hydraulic jack 24 which is operable in extension for closing the shear assembly 17 in cutting through the trunk of a tree properly arranged in the harvester attachment. Retraction of the jack 24 serves to reopen the shear assembly for further processing of the tree or for placing the harvester attachment in proper association with another standing tree to be cut and processed.

A pair of double acting hydraulic jacks 27 are interconnected between the rigid frame 16 and the respective grapple arms 19 of FIG. 1. The jacks 27 are operable in extension for closing the grapple arms 19 against a tree and for urging it into engagement with the drive mechanism 18. The jacks 27 are also retractable to open the grapple arms 19 and release the tree from the harvester.

Another pair of double hydraulic jacks 28 are respectively associated with the blade elements 22 of the delimbing assembly 21. The jacks 28 are operable in extension for wrapping the blade elements 22 in processing engagement about the circumference of a tree. The jacks 28 are also retractable in order to open the delimbing assembly either to release a tree from the harvester or to facilitate delimbing of the tree in a manner described in greater detail below.

To briefly describe the manner of operation for the tree harvester, the harvester attachment 11, in the upright position as shown by FIG. 1, is maneuvered by the vehicle to receive a standing tree within the shear assembly 17 and between the grapple arms 19 and blade elements 22 of the delimbing assembly 21. The grapple arms and delimbing blade members are then closed for maintaining the tree within the harvester attachment while the shear assembly 17 is actuated to sever the tree from the ground.

The tree is then rotated forwardly into a generally horizontal position along with the harvester attachment 11 as is illustrated in FIG. 2. The tree is then urged in a leftwardly direction, as viewed in that figure, through the delimbing assembly 21 to remove limbs and other projections and through the retracted shear assembly 17. During this phase of operation the blade elements 22 continue to be urged into processing engagement with the circumference of the tree and the grapple arms 19 continue to urge the tree into proper engagement with the drive mechanism 18. Due to the reduction in diameter toward the top of the tree and other variations in its circumference, the blade elements 22 of the delimbing assembly must have some degree of freedom so that they may move either inwardly or outwardly in order to remain in close engagement with the tree. Similarly, it is desirable to vary the force with which the tree is urged against the drive mechanism 18 by the grapples 19 in order to facilitate the delimbing process and to prevent damage to the tree due to interaction with sharpened drive elements (not shown) of the drive mechanism 18. To overcome both of these problems, it is desirable that the hydraulic fluid pressure for operating the grapple motors 27 be proportional or equal to the hydraulic pressure required in the drive motor 23 (see FIG. 3) for operation of the drive mechanism 18.

It is thus apparent that either or both the grapples and delimbing blade elements must remain in closed engagement with the tree during actuation of both the shear assembly 17 and drive mechanism 18 in order to prevent the tree from shifting out of the harvesting attachment. It may also be desirable to actuate the shear assembly during the delimbing process, for example, either to cut the tree into sections or to remove an unusable top portion of the tree. After complete processing of the tree, it is then necessary to open both the grapples and delimbing assembly either to release a remaining portion of a processed tree and/or to receive a new tree for processing.

The control circuit of FIGS. 3 and 4 is particularly adapted to accomplish the various functions described above with minimum manipulative control so that an operator will be free to direct his attention toward other matters, such as operation of the vehicle 14. Also due to the relatively automatic operation of the control circuit, the processing of each tree may be accomplished in a relatively shorter period of time, thus improving overall efficiency.

To simplify manipulative control of the harvester attachment, it is contemplated that the control circuit of FIGS. 3 and 4 operate relatively automatically under the influence of a single control valve 31 having two operating positions, a shear position being indicated at S and a processing position being indicated at P with a neutral position being indicated at N. A spool 32 in the control valve 31 is preferably shifted between these various positions by fore and aft movement of a control lever indicated at 33.

After processing of each tree is completed, for example, the motors 28 and grapple motors 27 may be selectively retracted through operation of a pilot control valve 34. The pilot valve 34, which could also be replaced, for example, by an electrical solenoid operating switch means, is preferably operated by leftward tilting (as viewed in FIG. 3) of a handle 36 which is pivotably secured to the control lever 33. In this manner, both of the control valves 31 and 34 may be operated by the single handle or member 36.

It is also noted at this point that, because of the use of impact shearing blades in the delimbing assembly, a crooked or forked tree might become lodged against the delimbing assembly and prevent further processing of the tree. Accordingly, a reversing control valve 37 is also provided to selectively open the delimbing assembly and permit the crooked or forked portion of the tree to pass through the delimbing blades. Although the reversing control valve 37 is illustrated for operation by a separate lever or member 38, it is apparent that this valve could also be actuated by operation of the control handle or member 36 in still another mode, for example, by means of a push button (not shown). The operation of the main control valve 31, the pilot control valve 34 and reversing control valve 37 are described below in greater detail along with the remainder of the control circuit.

As well as reducing manipulative duties of the operator, the present control circuit also substantially reduces the number of hydraulic lines or other conduits for connecting the harvesting attachment 11 with the operator's station on the vehicle. For example, only a pair of main fluid conduits 41 and 42 are necessary to communicate the control valve 31 with other portions of the control circuit which may be closely associated with the harvester attachment 11. Only a single pilot fluid line or conduit is necessary to communicate either the pilot control valve 34 or the reversing control valve 37 with associated portions of the control circuit.

The major components of the control circuit of FIGS. 3 and 4 along with their functions in operating the tree harvester are set forth immediately below preceding a relatively detailed description of the control circuit.

Referring now to FIGS. 3 and 4 together, the first main fluid line 41 is in free communication with a supplemental branched line 41a while the second main fluid line 42 is also a branched line for communication with various portions of the control circuit. When the control valve spool 32 is shifted to its shear position S, a source of fluid under pressure or pump 43 is communicated through a passage 44, past a check valve 46 and across an annular groove 47 in the spool 32 into the first main fluid line 41. The second main fluid line 42 is simultaneously communicated with an internal drain passage 48 across another annular groove 49 in the spool 32. Similarly, when the control valve spool 32 is shifted to its processing position P, the source or pump 43 is in communication with the second main fluid line 42 across the annular groove 48 and the first main fluid line 41 is in communication with the drain passage 48 across the annular groove 47. When the control valve spool 32 is in its neutral position, fluid from the pump 43 is communicated directly to the drain passage 48 across another pair of annular grooves in the spool 32.

When the spool 32 is shifted to its shear position, fluid under pressure in the first main fluid line 41 and 41a is directed to the head end of the shear motor 24 for actuating the shear assembly 17 (see FIG. 1) while exhaust fluid from the rod end of the shear motor 24 is communicated to the second main fluid line 42 through a supplemental line 42a and then to drain through the control valve 31. A sequencing valve 52 is in communication with both main fluid lines to facilitate operation of the shear motor 24 in a manner described in greater detail below.

Simultaneously with actuation of the shear motor 24, fluid from the first main line 41 is communicated by a fluid path comprising a directional valve 53 and a first fluid conduit 54 to the head ends of the grapple and delimbing motors 27 and 28 so that both the grapples 19 and delimbing assembly 21 (see FIG. 1) are closed upon the tree in order to maintain it in proper alignment with the harvesting attachment after it is severed by the shear assembly. The directional valve 53 is responsive to fluid pressure in the first main line 41, as described in greater detail below, to provide fluid communication with the first fluid conduit 54.

After severing of the standing tree is completed, the control valve spool 32 is shifted rightwardly to its processing position so that fluid under pressure is directed into the second main fluid line 42. The shear motor 24 is thus retracted in order to open the shear assembly. Increased fluid pressure resulting in the second main line 42 due to complete retraction of the shear motor 24 causes a check valve 56 to open, thus communicating operating fluid pressure to the drive motor 23.

During repositioning of the main control valve 31, a check valve 57 which communicates the first fluid conduit 54 with the grapple and delimbing motors 27, 28 prevents those motors from retracting under the suspended weight of the tree (See FIG. 2). With the control valve spool 32 in its processing position P, the directional valve 53 continues to communicate fluid under pressure from the second main line 42 to the head ends of the grapple and delimbing motors 27 and 28 by means of the first fluid conduit 54. In this regard, it is noted that the directional valve 53 tends to assume the condition shown in FIG. 3 when the valve spool 32 is shifted to its processing position and fluid from the pump 43 is directed to the second main line 42 instead of the first main line 41.

The check valve 57 also performs additional functions in combination with a load piston 59 and a shuttle valve 61 which is in communication with an inlet line 62 for the drive motor 23 by means of a fluid line 63 and with the second conduit 58 by means of a fluid line 64. These components operate in combination after opening of the check valve 56 to provide equal operating fluid pressure to both the drive motor 23 and the head ends of the grapple motors 27 so that the engagement force between the grapples 19 and the tree (see FIGS. 1 and 2) is dependent upon and equal to the operating fluid pressure necessary to the drive motor 23 to maintain operation of the drive mechanism 18. (see FIGS. 1 and 2). Similarly, these components function together to provide fluid under pressure to both the rod and head ends of the delimbing motors 28 so that those motors are free for "floating" operation with the delimbing blades 22 tending to be urged into engagement with the tree only by the differential areas of fluid responsive pistons 28a in the delimbing motors 28.

Because of the association of the shuttle valve with the second conduit 58 through the fluid line 64, these components also function together for permitting retraction of the grapple motors 27 and delimbing motors 28 as provided for by the directional valve 53 under the influence of the pilot control valve 34.

A reversing valve 66 is in communication with the head ends of the delimbing motors 28 by means of a fluid line 67. A spool 68 in the reversing valve 66 normally communicates the line 67 with the first conduit 54 by means of the check valve 57 and supplemental first conduit 54a while being operable under influence of the reversing control valve 37 to communicate the line 67 with the second conduit 58 for permitting selective retraction of the delimbing blades 22 (see FIGS. 1 and 2).

It is also noted at this point that for proper operation of the grapples and delimbing assembly, the rod ends of the grapple motors 27 are in communication with the second conduit 58 while the rod ends of the delimbing motors 28 are in communication with the second main fluid line 42.

To describe various components of the control circuit in greater detail, the sequencing valve 52 includes a spool 71 slidably arranged in a bore 72. As the control valve 31 is shifted into its shear position and fluid is directed toward the head end of the shear motor 24 through the supplemental main line 41a, exhaust fluid from the rod end of the shear motor passes through the supplemental line 42a and then to the second main line 42 by means of metering slots 73 formed in the spool 71. The metering slots 73 tend to inhibit the flow of fluid from the rod end of the shear motor 24 resulting in a pressure increase in the supplemental main line 41a which is communicated to the left end of the spool 71 by a line 74. This increased pressure acting on the left end of the spool 71 shifts it rightwardly so that the supplemental line 42a is placed in substantially free communication with the supplemental line 41a across an annular groove 76 in the spool 71. A closed hydraulic loop is thus provided for operating the shear motor at a relatively high speed until the shear assembly engages the tree in cutting relation which further increases fluid pressure in the supplemental line 41a. This further increased pressure is communicated through an internal passage 77 and shifts a two-speed valve member 78 against a spring 79 so that fluid from the supplemental line 41a is communicated through the passage 77 and the two-speed valve member 78 to a spring chamber 81 at the right end of the spool 71. The spool 71 is thus returned to the position shown in FIG. 4 so that the metering slots 73 again serve to communicate the supplemental line 42a with the main line 42. In this condition, the shear motor 24 is extended at a slower speed but with substantially increased force sufficient to permit complete severing of the tree by the shear assembly (see FIG. 1).

Also, when the control valve spool 32 is shifted to the shear position, fluid in the first main line 41 is communicated to the supplemental line 41a by an internal passage 91 which is also in communication with a spool 92 slidably arranged in a bore 93 of the directional valve 53.

Fluid under pressure from the first main line 41 is also communicated through a line 94 to a spring loaded spool 96 in the pilot control valve 34 which normally provides communication through another line 97 with the left end of the spool 92 in the directional valve 53. The directional valve spool 92 is thus shifted rightwardly against its spring 98 so that the internal passage 91 is in communication with the first conduit 54 across an annular groove 99 in the spool 92.

As noted above, fluid under pressure in the first conduit 54 is communicated across the check valve 57 into the supplemental conduit 54a which is in communication with the head ends of the grapple motors 27 so that the grapples are closed upon the tree. Fluid from the supplemental conduit 54a is also communicated to the spool 68 of the reversing valve which is normally positioned by a spring 101 to communicate the supplemental conduit 54a with the line 67 and accordingly with the head ends of the delimbing motors 28 for urging the delimbing blade members (see FIGS. 1 and 2) into closed engagement with the tree.

As discussed in greater detail below, the check valve 57 normally acts as a lock valve to maintain the grapples and delimbers in closed engagement with the tree during pressurization of the second main fluid line and operation of the directional valve in the manner described below to communicate the second main line with the grapple and delimber motors.

After the tree is severed from the ground and shifted into a proper position as illustrated, for example, in FIG. 2, the control valve spool 32 is then shifted to its processing position P in order to condition the control circuit for properly operating the various components of the harvester.

With the control valve spool 32 in its processing position P, the pump 43 is communicated with the second main line while the first main line 41 is communicated to drain. Fluid under pressure in the second main line 42 crosses the slots 73 in the sequencing valve 52 and passes through the supplemental line 42a to retract the shear motor 24. Full retraction of the shear motor 24 results in increased fluid pressurization in the supplemental line 42a and the second main line 42 which serves to open the valve 56 and communicate operating fluid pressure to the drive motor 23 for setting the drive mechanism (see FIGS. 1 and 2) in motion to propel the tree through the delimbing assembly 21.

When the control valve spool 32 is shifted to its processing position P, fluid pressure in the second main line 42 is also communicated through a line 102 which is normally blocked by the spring loaded spool 96 in the pilot control valve 34. Since the first main line 41 is communicated to drain, there is then no fluid pressure acting on the left end of the spool 92. It is accordingly shifted leftwardly by the spring 98 so that an annular groove 103 in the spool 92 communicates the first conduit 54 with an internal passage 104 which also provides communication between the second main line 42 and the check valve 56. Thus, fluid pressure continues to be communicated across the check valve 57 and into the supplemental conduit 54a so that the grapples and delimbing blades continue to be urged into engagement with the tree.

Fluid pressure in the second main line 42 is also communicated to the shuttle valve 61 through the line 63. Fluid pressure in the line 63 shifts a ball 111 in the shuttle valve 61 upwardly to close off the line 64 and enter a chamber 112 behind the load piston 59. The load piston 59 is thus shifted rightwardly so that the spring loaded check valve 57 is maintained in an open position as long as fluid is being delivered to the drive motor 23.

Thus, the fluid pressure which is communicated across the check valve 56 to the drive motor 23 and the load piston chamber 112 is equal to the fluid pressure communicated across the directional valve spool 92 to the first conduit 54 and the head ends of the grapple motors 27. This manner of pressurizing the head ends of the grapple cylinders permits the grapple arms 19 (see FIG. 2) to move in and out over projections or surface irregularities on the tree without substantially affecting fluid pressure in the grapple motors. Equalization of fluid pressure in the drive motor 23 and grapple motors 27 also provides for increased engagement of the grapple arms with the tree, for example, when large limbs enter the delimbing assembly requiring relatively increased operating pressure for the drive motor 23. Thus, the grapple arms are urged into tighter engagement with the tree to prevent slippage between the tree and the drive mechanism 18. When there is limited resistance arising from interaction between the tree and the delimbing assembly, for example, the fluid pressure required to operate the drive motor 23 is accordingly reduced. The grapple motors 27 accordingly urge the grapple arms 19 into lighter engagement with the tree, thus reducing the friction between the tree and the grapple arms and generally facilitating operation of the tree harvester. It is to be particularly noted that the setting for the check valve 56 is such that fluid pressure communicated thereacross to the drive motor and to the load piston 59 is also sufficient to prevent the weight of the tree (see FIG. 2) from opening the grapple arms.

During this operating condition of the control circuit, operating fluid pressure in both the first conduit 54 and the second main fluid line 42 provides fluid under pressure at both the head and rod ends of the delimber motors 28. Because of the differential areas on the opposite sides of the fluid responsive pistons 28a, the motors 28 tend to maintain the blade elements 22 of the delimber in engagement with the tree.

As noted above, crooks or forks in the tree may not properly pass through the delimbing assembly upon engagement with the blade elements 22. Under such circumstances, the reversing control valve 37 may be operated to communicate fluid under pressure through a line 113 to urge the reversing valve spool rightwardly and communicate the line 67 with the first main fluid line 58 which is in communication with a fluid drain across the control valve 31. Fluid under pressure in the second main line 42 retracts the delimbing motors, thus permitting the crooked or forked portion of the tree to pass the delimbing assembly. The reversing control valve 37 may then be released to permit repositioning of the reversing valve spool 68 by its spring and extension of the delimbing motors 28 to again cause engagement of the delimbing blade elements 22 with the tree.

To cut the delimbed tree into sections of various lengths or to sever an unusable top portion of the tree after it is delimbed, the control valve spool 32 may be intermittently shifted to its shear position S so that a shearing operation would occur in the manner described above. The control valve spool 32 may then be returned to its processing position P if further delimbing of the tree is necessary.

After the delimbing operation has been completed and the operator wishes to release any remaining portion of the tree in the harvester and recondition the harvester for receiving another standing tree, he merely tilts the control valve lever or member 36 so that the pilot control valve spool 96 is shifted downwardly to communicate fluid under pressure from the line 102 into the line 97 and against the left end of the spool 92. The spool 92 is thus shifted rightwardly so that fluid pressure from the passage 104 is communicated into the second conduit 58. Fluid under pressure in the second conduit 58 enters the rod end of the grapple motors 27 directly and also passes into the load piston chamber 112 through the fluid line 64 and across the shuttle valve 61. Thus, the check valve 57 is again opened by the load piston 59 in order to communicate the head ends of both the grapple motors 27 and delimbing motors 28 with the first conduit 54 which is now in communication with drain across the directional valve spool 92 and through the internal passage 91, the first main line 41 and the control valve 31. Fluid under pressure in the conduit 58 serves to retract the delimbing motors 28 and the grapple motors 27 so that the tree is released from the harvester. At this time, the delimbing assembly 21, the grapple arms 19 and the shear assembly 17 are all open or retracted so that the harvester attachment 11 may be again positioned to receive another standing tree after the harvesting attachment 11 is shifted to an erect position by means of the tilt linkage 13.

The pilot control valve 34 may also be employed to retract the delimbing motors 28 and grapple motors 27 when the spool 32 of the control valve 31 is in the shear position S. Operation of the pilot control valve 34 then places the line 97 in communication with drain across the pilot control valve and through the line 102 and second main line 42. The spool 92 is then shifted leftwardly by its spring 98 to the position shown in FIG. 3 with the internal passage 91 being in communication with the second conduit 58 across the annular recess 99.

It is apparent that various components of the disclosed control circuit can be replaced by other components serving a generally similar function within the contemplated scope of the present invention. For example, one or more of the check valves 46, 56 and 57 could operate as relief valves with minor modification of associated portions of the circuit while not substantially affecting the disclosed mode of operation.

What is claimed is:

1. A hydraulic control circuit for a tree harvester of the type having a shear assembly operated by a hydraulic shear motor, a processing implement with a hydraulic motor for urging the implement into processing engagement with a tree, drive means including a hydraulic drive motor for propelling the tree past the implement and hydraulic powered grapple means associated with the drive means for urging the tree into engagement with the drive means, the control circuit comprising a control valve for selectively communicating first and second main fluid lines with a fluid pump and a fluid drain, means for communicating the main fluid lines with the shear motor, means for communicating one of the main fluid lines with the drive motor so that operation of the shear assembly as effected by the shear motor and operation of the drive motor are separately initiated by the control valve placing the pump in respective communication with the main fluid lines, a directional valve and check valve means for communicating the two main lines with the implement motor and grapple means, the directional valve normally functioning to provide fluid communication with the implement motor and grapple means so that the implement and grapple means tend to engage the tree, the check valve maintaining the engagement tendency of the implement and grapple means during repositioning of the control valve, and directional control means operatively associated with the directional valve for causing the directional valve to reverse communication of the main fluid lines with the implement motor and grapple means, thus disengaging the implement and grapple means from the tree.

2. A hydraulic control circuit for a tree harvester of the type having a hydraulically operable shear assembly, a processing implement, hydraulically operable drive means for propelling a tree past the implement and hydraulically operable grapple means for urging the tree into engagement with the drive means comprising a source of fluid under pressure, a control valve operable into a first position to communicate fluid for engagement of the grapple means with the tree and for actuating the shear assembly, the control valve also being operable into a second position to retract the shear assembly and actuate the drive means, a directional valve operable to communicate fluid from the control valve in either of its operating positions to cause engagement of the grapple means, first check valve means for communicating fluid from the directional valve to the grapple means, and second check valve means operable for communicating fluid to the drive means when the control valve is in its second position with the shear being retracted, the first check valve means being responsive to operation of the second check valve means for providing fluid pressure tending to engage the grapple means in general proportion with operating fluid pressure for the drive means so that a force of engagement between the tree and drive means as produced by the grapple means varies with the fluid pressure necessary to maintain operation of the drive motor.

3. The control circuit of claim 2 further comprising a remote control means associated with the implement and grapple means, the remote control means being operable to cause retraction of the implement and grapple means to release the tree.

4. The control circuit of claim 3 further comprising a single control member being operable in a first mode to position the control valve and in a second mode to operate the remote control means.

5. The control circuit of claim 3 wherein the implement is hydraulically operable for processing engagement and retraction relative to the tree, the implement also being associated with the control valve, the directional valve, and the remote control means for engagement and retraction along with the grapple means.

6. The control circuit of claim 5 further comprising reversing means associated with the implement to selectively retract and reengage the implement.

7. The control circuit of claim 5 wherein the implement is operable into engagement with the tree by extension of a hydraulic implement jack, the implement jack being associated with the first check valve means which are responsive to operation of the second check valve means for communicating both the head end and rod end of the implement jack with fluid from the control valve to permit floating operation of the implement jack during operation of the drive motor.

8. The control circuit of claim 7 further comprising reversing means associated with the implement jack for selectively retracting and reengaging the implement.

9. The control circuit of claim 8 wherein the implement is a delimbing mechanism including blade means urged into engagement with the tree by extension of the implement jack.

10. The control circuit of claim 7 wherein the control valve selectively communicates the source with either a first or second main fluid line, the shear assembly including a double acting hydraulic motor in communication with both main lines, the second main line being in communication with a fluid inlet for a hydraulic motor of the drive means, the directional valve being operable for selectively communicating the first and second main fluid lines with first and second conduits, the first conduit providing fluid communication across the first check valve means with the head end of the implement jack and grapple means, the grapple means also being in communication with the second conduit, the rod end of the implement jack being in communication with the second main line.

11. The control circuit of claim 10 wherein the first check valve means includes piston means responsive to fluid under pressure from either the drive motor inlet or the second conduit for opening the first check valve means.

12. The control circuit of claim 11 further comprising a shuttle valve in communication with the piston, the shuttle valve being in communication with the drive motor inlet and second conduit by means of pilot fluid lines.

13. The control circuit of claim 10 further comprising remotely operable reversing valve means for selectively communicating the head end of the implement jack with the first and second conduits.

14. A hydraulic control circuit for a tree harvester of the type having a processing implement, drive means powered by a hydraulic drive motor for propelling a tree past the implement and grapple means operable by hydraulic motor means for urging the tree into engagement with the drive means, hydraulic motor means being associated with the implement for urging the implement into processing engagement with the tree, the circuit comprising a control valve for selectively communicating first and second main fluid lines with a source of fluid under pressure and a fluid drain, means communicating one of the main fluid lines with the drive motor to provide operating fluid pressure for the drive motor, means respectively communicating the main fluid lines with each of the grapple motor means and implement motor means, a check valve means providing a communication between the one line and the grapple motor means, and means communicating the operating fluid pressure to the check valve means, the check valve means including means responsive to the operating fluid pressure for opening the check valve and providing generally interdependent operating pressures to the drive motor and grapple motor means so that a force of engagement between the tree and drive means as produced by the grapple means is dependent upon the pressure necessary to maintain operation of the drive motor.

15. The control circuit of claim 14 wherein the implement motor means is a double-acting hydraulic jack operable in extension for urging the implement into processing engagement with the tree, the check valve means including a check valve member resiliently urged into closing relation with a conduit communicating with the grapple motor means and piston means for opening the check valve member in response to fluid pressure from an inlet portion of the drive motor.

16. A hydraulic control circuit for a tree harvester of the type having a processing implement and drive means powered by a hydraulic drive motor for propelling a tree past the implement for processing, double-acting hydraulic motor means being associated with the implement, the motor means being differentially responsive to fluid pressure for urging the implement into and out of processing engagement with the tree, the control circuit comprising a control valve for respectively communicating first and second main fluid lines with a source of fluid under pressure and a fluid drain, means communicating the first main fluid drive with the drive motor to provide operating fluid pressure for the drive motor, and valve means for initially communicating the first main fluid line with one side of the double-acting motor means for engaging the implement with the tree, the valve means including means responsive to the operating fluid pressure for communicating both sides of the double-acting motor means with the first main fluid line to permit floating operation of the double-acting motor means with the defferential response of the motor means tending to maintain processing engagement of the implement with the tree during operation of the drive motor.

17. The control circuit of claim 16 wherein the tree harvester includes hydraulic powered grapple means for urging the tree into engagement with the drive means, the valve means also initially communicating the first main fluid line with the grapple means, the responsive means also establishing generally proportioned operating pressures for the drive motor and grapple means so that a force of engagement between the tree and drive means as developed by the grapple means varies with the pressure necessary to maintain operation of the drive motor.

18. The control circuit of claim 16 wherein the double-acting motor means is a jack including a cylinder containing a slidable piston with a rod secured to the piston and slidably penetrating the cylinder for effective coupling with the implement.

19. A hydraulic control circuit for a machine of the type having a processing implement, drive means powered by a hydraulic drive motor for propelling an object to be processed past the implement and hydraulically operable grapple means for urging the object into engagement with the drive means, the control circuit comprising a source of fluid under pressure, means in communication with the source for providing operating fluid pressure to a third inlet of the drive motor, valve means for communicating operating fluid pressure to the grapple means and causing the grapple means to urge the object into engagement with the drive means, and means responsively communicated with operating fluid pressure in the drive motor inlet and associated with the valve means for maintaining the grapple means operating fluid pressure in proportion with operating fluid pressure for the drive means so that a force of engagement between the object and drive means as produced by the grapple means is dependent upon the fluid pressure operating the drive motor.

* * * * *